(12) United States Patent
Inagaki

(10) Patent No.: US 11,754,156 B2
(45) Date of Patent: Sep. 12, 2023

(54) DRIVE DEVICE

(71) Applicant: HI-LEX CORPORATION, Takarazuka (JP)

(72) Inventor: Hiroyuki Inagaki, Takarazuka (JP)

(73) Assignee: HI-LEX CORPORATION, Takarazuka (JP)

( * ) Notice: Subject to any disclaimer, the term of this patent is extended or adjusted under 35 U.S.C. 154(b) by 0 days.

(21) Appl. No.: 17/287,806

(22) PCT Filed: Oct. 23, 2019

(86) PCT No.: PCT/JP2019/041509
§ 371 (c)(1),
(2) Date: Apr. 22, 2021

(87) PCT Pub. No.: WO2020/085375
PCT Pub. Date: Apr. 30, 2020

(65) Prior Publication Data
US 2021/0396300 A1 Dec. 23, 2021

(30) Foreign Application Priority Data
Oct. 23, 2018 (JP) .............................. JP2018-198824

(51) Int. Cl.
*F16H 25/24* (2006.01)
*F16H 25/20* (2006.01)
*E05F 15/622* (2015.01)

(52) U.S. Cl.
CPC ......... *F16H 25/2021* (2013.01); *F16H 25/24* (2013.01); *E05F 15/622* (2015.01)

(58) Field of Classification Search
CPC .... E05F 15/622; F16H 25/24; F16H 25/2021; F16H 25/205; F16H 2025/2436; F16H 2025/2071; F16H 25/2006
See application file for complete search history.

(56) References Cited

U.S. PATENT DOCUMENTS 2,701,478 A * 2/1955 Riess .................. F16H 35/10
74/411
5,315,064 A * 5/1994 Andrews ............... H02G 7/04
439/258

(Continued)

FOREIGN PATENT DOCUMENTS

CA 2818787 A1 12/2013
EP 2199513 B1 5/2013

(Continued)

OTHER PUBLICATIONS

Int'l. Search Report issued in Int'l. application No. PCT/JP2019/041509, dated Dec. 10, 2019.

(Continued)

*Primary Examiner* — Gregory Robert Weber
(74) *Attorney, Agent, or Firm* — Greer Burns & Crain Ltd.

(57) ABSTRACT

A drive device comprises a housing, a drive portion, a spindle member to rotate by driving of the drive portion, a nut member screwed with the spindle member); a moving member coupled to the nut member, and a rotation regulating portion which suppresses rotation of the nut member to move the nut member) in an axis X direction of the spindle member, wherein the moving member has a fragile portion to be broken by a predetermined force being weaker than a force required to break the nut member, and the fragile portion is configured that a fracture portion with which the nut member is pressable by the moving member toward the drive portion is formable when the fragile portion is broken.

4 Claims, 8 Drawing Sheets

(56) References Cited

U.S. PATENT DOCUMENTS

| | | | | |
|---|---|---|---|---|
| 8,375,814 B2* | 2/2013 | Hillen | ............... | E05F 15/622 |
| | | | | 74/89.38 |
| 2005/0132830 A1* | 6/2005 | Gerbier | ............... | F16H 25/20 |
| | | | | 74/89.23 |
| 2007/0062119 A1* | 3/2007 | Ritter | ............... | F16H 25/20 |
| | | | | 49/343 |
| 2008/0060463 A1* | 3/2008 | Boehen | ............... | E05F 15/622 |
| | | | | 74/424.76 |
| 2010/0186528 A1* | 7/2010 | Hillen | ............... | E05F 15/622 |
| | | | | 192/56.6 |
| 2011/0101806 A1* | 5/2011 | Lovgren | ............... | F16H 25/2021 |
| | | | | 310/80 |
| 2011/0290050 A1 | 12/2011 | Kummer et al. | | |
| 2014/0326089 A1* | 11/2014 | Wu | ............... | F16H 25/2021 |
| | | | | 74/89.23 |
| 2017/0145727 A1* | 5/2017 | Yamagata | ............... | E05F 15/60 |
| 2019/0242171 A1* | 8/2019 | Wittelsbuerger | ....... | F16D 59/00 |

FOREIGN PATENT DOCUMENTS

| | | | |
|---|---|---|---|
| JP | 2006266420 A | 10/2006 | |
| JP | 2010105633 A | 5/2010 | |
| JP | 2012512973 A | 6/2012 | |

OTHER PUBLICATIONS

EPSR issued in EP patent application No. 19 87 5340, dated Jul. 8, 2022.

* cited by examiner

DRIVE DEVICE

This is a National Phase Application filed under 35 U.S.C. § 371, of International Application No. PCT/JP2019/041509, filed Oct. 23, 2019, the contents of which are incorporated by reference.

TECHNICAL FIELD

The invention relates to a drive device.

BACKGROUND ART

As a drive device to swing a back door of an automobile or an out-swinging window, a drive device being extendable/contractable is used, the drive device comprising a tubular first housing provided in a vehicle body and a tubular second housing being provided in a vehicle door and being capable of moving relatively with respect to the tubular first housing.

Such a drive device has, for example, a spindle to be rotationally driven by a motor, a spindle nut to transform rotary motion of the spindle into displacement in the rotation axis direction, and a push rod coupled to the spindle nut, for example. The above-described drive device having the above spindle further comprises a guide portion to guide movement of the spindle nut in the rotation axis direction and a cylindrical spring to assist displacement of the spindle nut in the rotation axis direction, for example (see Patent Document 1, for example).

PRIOR ART DOCUMENT

Patent Document

Patent Document 1: JP 2012-512973 A1

SUMMARY OF THE INVENTION

Problem to be Solved by the Invention

However, in the drive device disclosed in Patent Document 1, a connecting portion (such as a ball joint) provided between a vehicle body and a first housing and between a vehicle door and a second housing is used to allow a base body such as a back door to carry out swinging movement. In a case that an excessive load such as a large external force is applied to the drive device, the drive device is divided into the base body side and the housing side. In a case that the drive device is divided when the drive device is in an extended state, the drive device in the extended state, for example, hangs from the vehicle body, obstructing closing of the vehicle door. Therefore, the drive device connected to two base bodies is removed from one of the base bodies to cause a disturbance on the movement of the base body which is a driven target. Thereby, in a case an excessive load is applied, it is necessary to recognize an application of an excessive load before the drive device is divided from the base body.

An object of the invention is to provide a drive device, which is connected to two base bodies, that makes it possible to recognize that an excessive load is applied to the drive device without the drive device being divided from either one of the base bodies.

Means to Solve the Problem

A drive device according to the invention comprises: a housing having a first connecting portion connected to a first base body; a drive portion provided in the housing; a spindle member to rotate by driving of the drive portion; a nut member screwed with the spindle member; and a moving member coupled to the nut member, wherein the drive device has a rotation regulating portion which suppresses rotation of the nut member to move the nut member in an axis direction of the spindle member, the moving member has a second connecting portion connected to a second base body, and a fragile portion to be broken by a predetermined force being weaker than a force required to break the nut member, and the fragile portion is configured that a fracture portion with which the nut member is pressable by the moving member toward the drive portion is formable when the fragile portion is broken.

Effects of the Invention

A drive device according to the invention, which is connected to two base bodies, makes it possible to recognize that an excessive load is applied to the drive device without the drive device being divided from either one of the base bodies.

EMBODIMENT FOR CARRYING OUT THE INVENTION

Below, with reference to the drawings, a drive device according to one embodiment of the invention will be described. The embodiment shown below is merely one example, so that the drive device according to the invention is not limited to the embodiment below.

Figure 1:
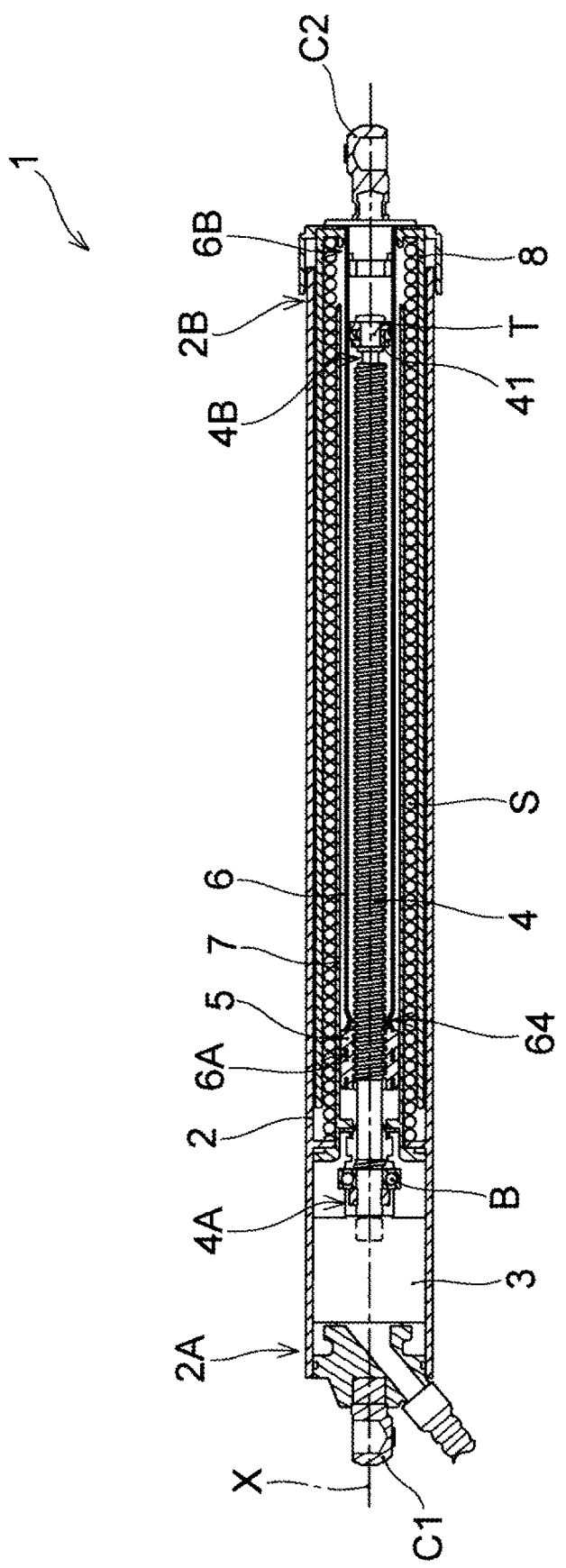
FIG. 1 shows a cross-sectional view in the contracted state of a drive device according to one embodiment of the invention, the drive device being cut in the longitudinal direction.
Figure 2:
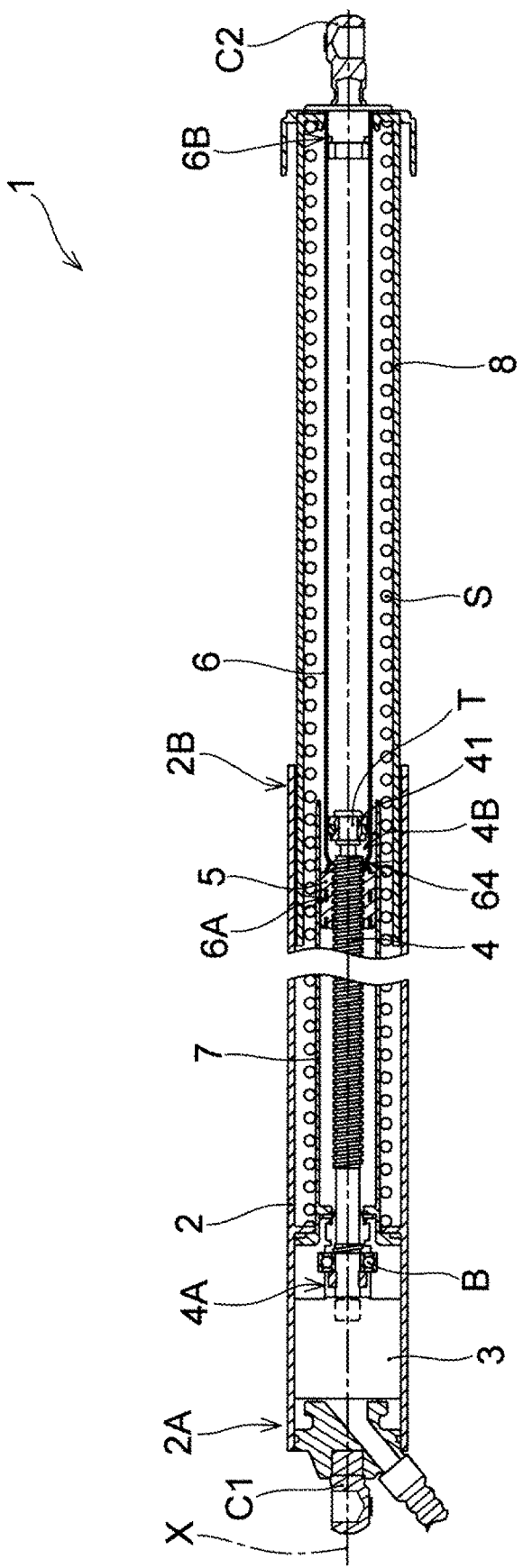
FIG. 2 shows a cross-sectional view in the extended state of the drive device in FIG. 1, the drive device being cut in the longitudinal direction.
Figure 3:
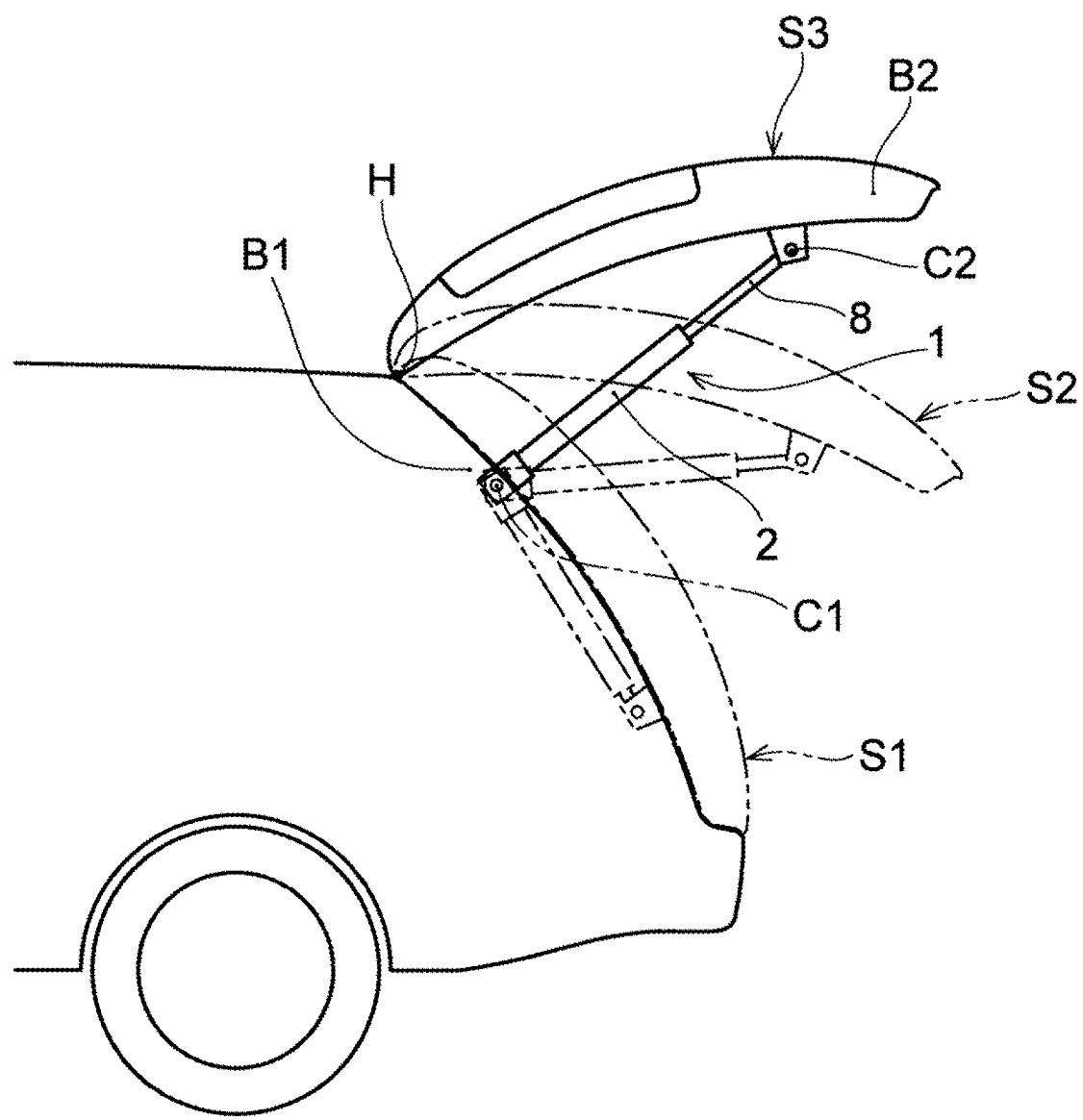
FIG. 3 schematically shows the state in which the drive device in FIG. 1 is mounted to a vehicle.

As shown in FIGS. 1 and 2, a drive device 1 in the embodiment comprises a housing 2 having a first connecting portion C1 to be connected to a first base body B1 (see FIG. 3), a drive portion 3 provided in the housing 2, a spindle member 4 to rotate by driving of the drive portion 3, a nut member 5 to be screwed with the spindle member 4, and a moving member 6 coupled to the nut member 5. The moving member 6 has a second connecting portion C2 to be connected to a second base body B2. The drive device 1 is connected to the first base body B1 and the second base body B2, as shown in FIG. 3, by the first connecting portion C1 of the housing 2 and the second connecting portion C2 of the moving member 6. As described below, in the drive device 1 in the embodiment, by the driving force of the drive portion 3, the moving member 6 projects from and retracts into the housing 2 to operate the first base body B1 and/or the second base body B2 being connected to the drive device 1.

In the embodiment, as shown in FIG. 3, the drive device 1 is applied to an opening/closing device of a back door of a vehicle. In the embodiment, the first base body B1 is a vehicle body (below also called a vehicle body B1), while the second base body B2 is a back door (below also called a back door B2) to rotate around a hinge H. As shown in FIG. 3, when the drive portion 3 is driven from the closed state shown with a reference letter S1, in which the back door B2 closes the rear opening of the vehicle, the moving member 6 projects from the housing 2 to start opening of the back door B2. As the amount of projection of the moving member 6 from the housing 2 increases, the back door B2 moves to the opened state shown with a reference letter S3 via the halfway opened state shown with a reference letter S2. The back door B2 moves from the opened state S3 to the closed state S1 when the moving member 6 moves to be housed in the housing 2 by the drive portion 3 from the opened state S3 of the back door B2.

In the embodiment, an example in which the drive device 1 is applied to the opening/closing device of the back door of the vehicle is shown. However, the use of the drive device 1 is not limited to the opening/closing device of the back door. For example, the drive device 1 may be applied to an opening/closing device of an opening/closing body other than the back door or an extension/contraction device to carry out an extension/contraction operation.

As shown in FIGS. 1 and 2, the housing 2 houses the drive portion 3. The housing 2 is configured as a hollow cylindrical member having a circular cylindrical shape, for example, and houses the drive portion 3 int the housing 2. In the embodiment, the housing 2 houses the spindle member 4 and the nut member 5 in addition to the drive portion 3.

The housing 2 is connected to the first base body B1 by the first connecting portion C1. In the embodiment, the first base body B1 is a vehicle body. More specifically, the first base body B1 is the opening edge of the rear opening of the vehicle being closed by the back door. However, the first base body B1 is not limited to the vehicle body, so that the first base body B1 may be changed as needed in accordance with the object to which the drive device 1 is applied.

It suffices that the first connecting portion C1 is connectable to the first base body B1, so the housing 2 may be connected so as to relatively move (such as swing) with respect to the first base body B1. Alternatively, the housing 2 may be fixed to the first base body B1 so as not to relatively move with respect to the first base body B1. In the embodiment, as shown in FIG. 3, the first connecting portion C1 is configured such that the housing 2 swings with respect to the first base body B1. While the structure to be used for the first connecting portion C1 is not particularly limited, a known joining structure such as a ball joint, a clevis, a pin joint, or a universal joint, for example, may be used.

In the embodiment, the housing 2 is formed in a circular cylinder shape (see FIG. 5) and has the first connecting portion C1 at one end 2A of the housing 2. Inside the housing 2, the drive portion 3 is provided on the one end 2A side and the spindle member 4 connected to the drive portion 3 extends toward the other end 2B of the housing 2 coaxially with the housing 2. In the embodiment, the drive device 1 has a cylindrical body 7 between the inner periphery of the housing 2 and the outer periphery of the spindle member 4. The inner peripheral surface of the cylindrical body 7 and the outer periphery of the spindle member 4 are separated in a diameter direction of the spindle member 4, and the nut member 5 is arranged between the inner peripheral surface of the cylindrical body 7 and the outer periphery of the spindle member 4. Moreover, the outer periphery of the cylindrical body 7 and the inner periphery of the housing 2 are separated in the diameter direction of the spindle member 4. Between the outer periphery of the cylindrical body 7 and the inner periphery of the housing 2, a movable cylinder 8 to move in conjunction with movement of the moving member 6 telescopically projects from and retracts into the housing 2. Moreover, besides the movable cylinder 8, a spring S to assist the operation of the moving member 6 and the movable cylinder 8 is provided between the outer periphery of the cylindrical body 7 and the inner periphery of the housing 2. One end of the spring S is mounted to a spring seat provided to the housing 2, and the other end of the spring S is mounted to a spring seat provided to the movable cylinder 8.

The drive portion 3 generates a driving force to rotate the spindle member 4 to move the moving member 6. In the embodiment, the drive portion 3 is an electric motor and is configured to rotate the spindle member 4 in normal and reverse directions with power fed from outside of the housing 2.

The spindle member 4 is a rod-shaped member having a male screw on the outer periphery. The spindle member 4 rotates around an axis X of the spindle member 4 by the drive portion 3 and moves, in the axis X direction of the spindle member 4, the nut member 5 screwed with the male screw of the spindle member 4. As shown in FIGS. 1 and 2, in the embodiment, the one end 4A side of the spindle member 4 is inserted through a bearing B and is connected to the drive portion 3. The other end 4B side of the spindle member 4 is positioned inside the moving member 6 having a substantially cylindrical shape. The tip on the other end 4B side of the spindle member 4 has a coming-off stopper portion 41 described below. In the embodiment, the inner peripheral surface of the moving member 6 is configured to slide with respect to the coming-off stopper portion 41 of the tip of the spindle member 4 when the spindle member 4 rotates by the drive portion 3 and the moving member 6 moves with the nut member 5 in the axis X direction.

The nut member 5 is a cylindrical body having a female screw on the inner periphery. The nut member 5 is configured to move with a predetermined stroke in the axis X direction of the spindle member 4 in accordance with rotation of the spindle member 4 around the axis X. The nut member 5 is coupled to the moving member 6, and the moving member 6 moves in the axis X direction with movement of the nut member 5 in the axis X direction.

Figure 5:
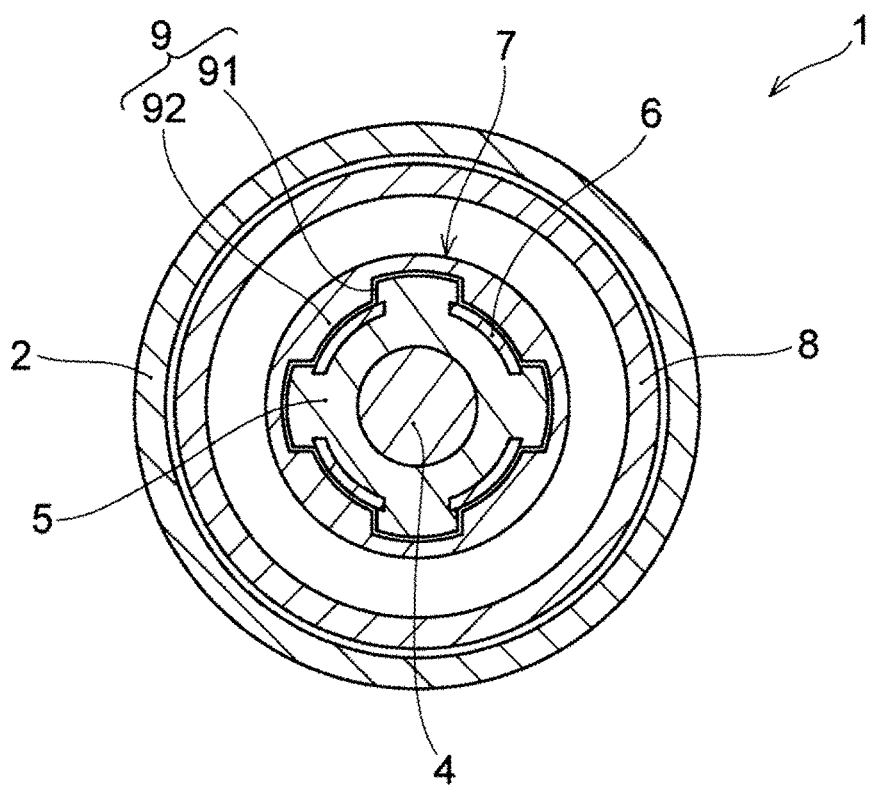
FIG. 5 shows a cross-sectional view along A-A line in FIG. 4.

In the embodiment, as shown in FIG. 5, the drive device 1 has a rotation regulating portion 9 to suppress rotation of the nut member 5 to move the nut member 5 in the axis X direction of the spindle member 4. It is suppressed by the rotation regulating portion 9 that the nut member 5 co-rotates with the spindle member 4. In this way, when the spindle member 4 rotates around the axis X, the nut member 5 being screwed with the spindle member 4 can move in the axis X direction of the spindle member 4.

In the embodiment, the rotation regulating portion 9 comprises, for example, a first regulating portion 91 provided on the outer periphery of the nut member 5, and a second regulating portion 92 being provided on the outer periphery side of the nut member 5 and engaging with the first regulating portion 91. The first regulating portion 91 and the second regulating portion 92 can suppress rotation of the nut member 5 by engagement between the first regulating portion 91 and the second regulating portion 92 in the direction around the axis X of the nut member 5. In the embodiment, as shown in FIG. 5, the rotation regulating portion 9 comprises the first regulating portion 91 having a groove shape on the outer periphery of the nut member 5, and the second regulating portion 92 configured by a protruded line(s), which is protruded inside the cylindrical body 7 from the inner peripheral surface of the cylindrical body 7 and extends along the axis X direction. In this way, the first regulating portion 91 of the nut member 5 engages, in the direction around the axis X, with the second regulating portion 92 being the protruded line to suppress rotation of the nut member 5 around the axis X and allows movement of the nut member 5 in the axis X direction. The structure of the rotation regulating portion 9 is not particularly limited as long as the rotation regulating portion 9 is configured to suppress rotation of the nut member 5 and allow movement of the nut member 5 in the axis X direction. For example, the second regulating portion 92 of the rotation regulating portion 9 may be a concave groove extending in the axis X direction and the first regulating portion 91 may be a projection such as a pin to engage with the concave groove in the direction around the axis X. Alternatively, the first regulating portion 91 and the second regulating portion 92 may be spline-fitted into each other.

As shown in FIGS. 1 and 2, the moving member 6 is coupled to the nut member 5 and moves in the axis X direction with movement of the nut member 5 in the axis X direction. The moving member 6 is coupled to the nut member 5 on the one end 6A side of the moving member 6. The moving member 6 is connected to the second base body B2 on the other end 6B side having the second connecting portion C2. In the embodiment, when the nut member 5 moves toward the one end 4A, which is drive portion 3 side, of the spindle member 4 in the axis X direction, the moving member 6 moves such that the moving member 6 is drawn into the housing 2. On the other hand, when the nut member 5 moves toward the other end 4B of the spindle member 4, the moving member 6 moves such that the moving member 6 projects from the housing 2. The drive device 1 extends/contracts by the operation of projecting from and retracting into the housing 2 of the moving member 6 to drive the second base body B2, which is an object to be driven such as the back door, connected to the moving member 6 via the second connecting portion C2.

In the embodiment, the second base body B2 is the back door of the vehicle. However, the second base body B2 is not limited to the back door, so that the second base body B2 may be changed as needed in accordance with an object to which the drive device 1 is applied. It suffices that the second connecting portion C2 is connectable to the second base body B2, and the moving member 6 may be connected so as to relatively move (such as swing) with respect to the second base body B2. Alternatively, the moving member 6 may be fixed to the second base body B2 so as not to relatively move with respect to the second base body B2. In the embodiment, the second connecting portion C2 is configured such that the moving member 6 swings with respect to the second base body B2. While the structure used for the second connecting portion C2 is not particularly limited, a known joining structure such as a ball joint, a clevis, a pin joint, or a universal joint, for example, may be used.

In the embodiment, a part of the moving member 6 at the one end 6A on the nut member 5 side is embedded into the nut member 5 using outsert molding to couple the moving member 6 to the nut member 5, for example. However, the method of coupling between the moving member 6 and the nut member 5 is not particularly limited as long as the moving member 6 and the nut member 5 are coupled such that the moving member 6 moves with movement of the nut member 5. In the embodiment, the moving member 6 is coupled to the nut member 5 so as to overlap the nut member 5 in the axis X direction.

The shape or structure of the moving member 6 is not particularly limited as long as the moving member 6 is coupled to the nut member 5 and the moving member 6 moves in the axis X direction with movement of the nut member 5. In the embodiment, the moving member 6 is substantially cylindrical. Specifically, the moving member 6 is arranged coaxially with the spindle member 4 and is formed in a shape of a hollow circular cylinder having the inner diameter being greater than the diameter of the spindle member 4. The moving member 6 is configured such that the moving member 6 houses the spindle member 4 therein when the nut member 5 and the moving member 6 move toward the drive portion 3.

Figure 4:
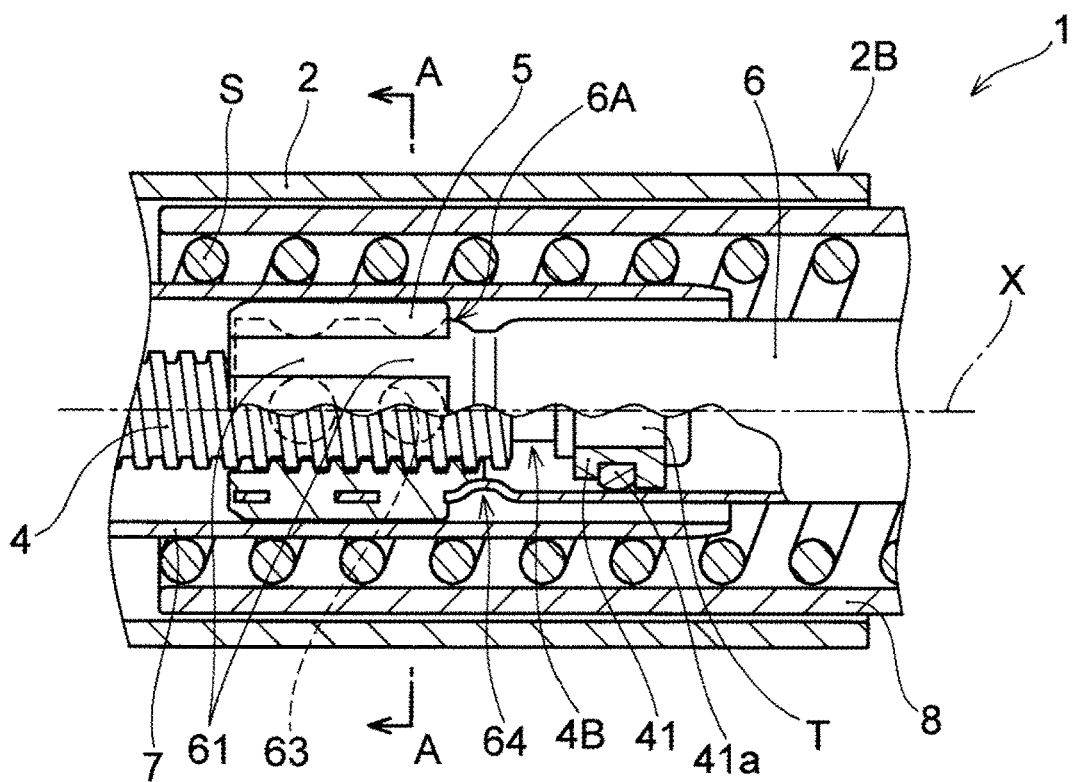
FIG. 4 shows an enlarged view of a coupling portion between a nut member and a moving member of the drive device in FIG. 1.
Figure 6:
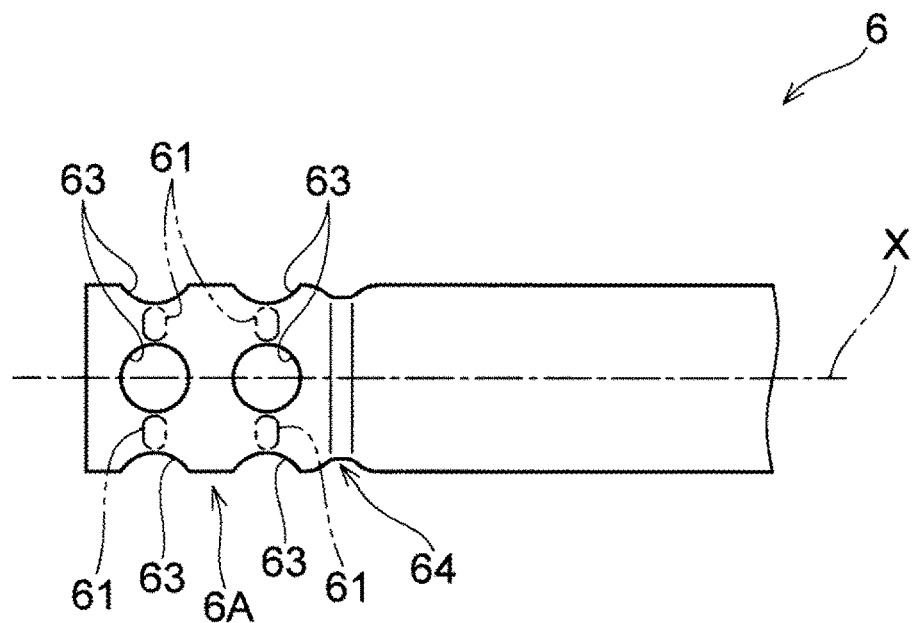
FIG. 6 shows a side view of the moving member used in the drive device in FIG. 1.

As shown in FIGS. 4 and 6, the moving member 6 has a fragile portion 61 to be broken by a predetermined force being weaker than a force required to break the nut member 5. Moreover, the fragile portion 61 is configured that a fracture portion 62 (see FIG. 7) with which the nut member 5 is pressable by the moving member 6 toward the drive portion 3 is formable when the fragile portion 61 is broken.

Figure 7:
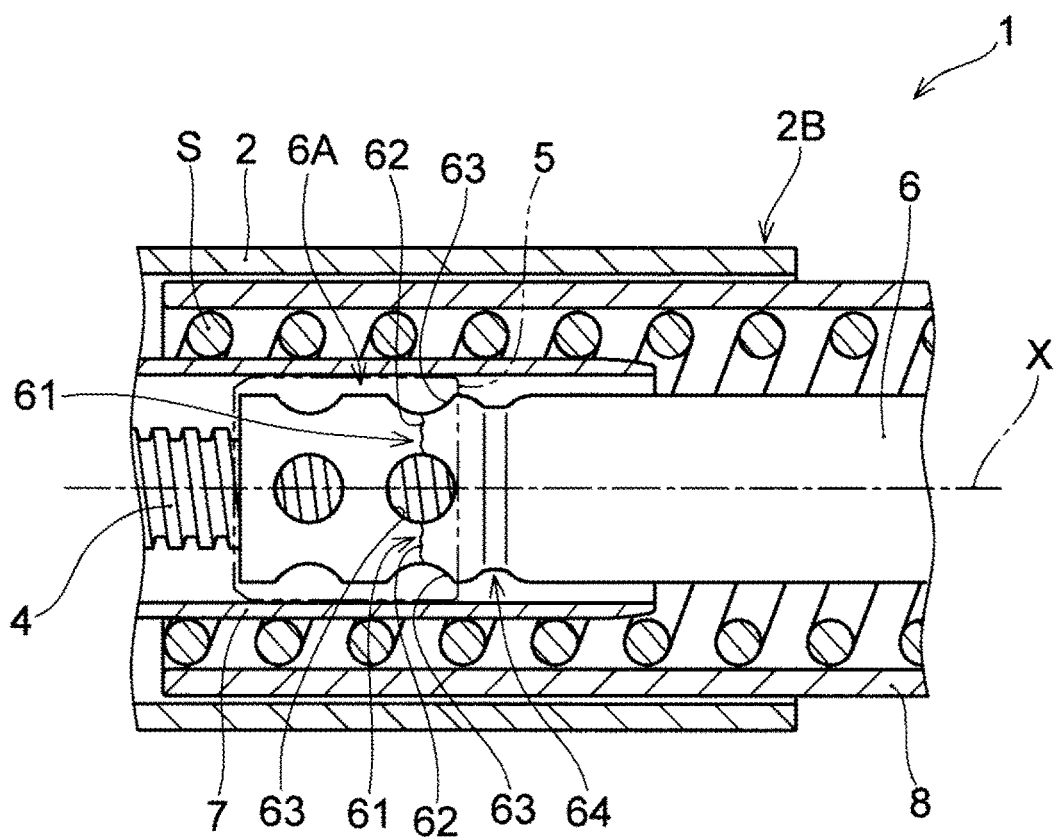
FIG. 7 schematically shows the state in which a fragile portion of the moving member used in the drive device in FIG. 1 is broken.
Figure 8:
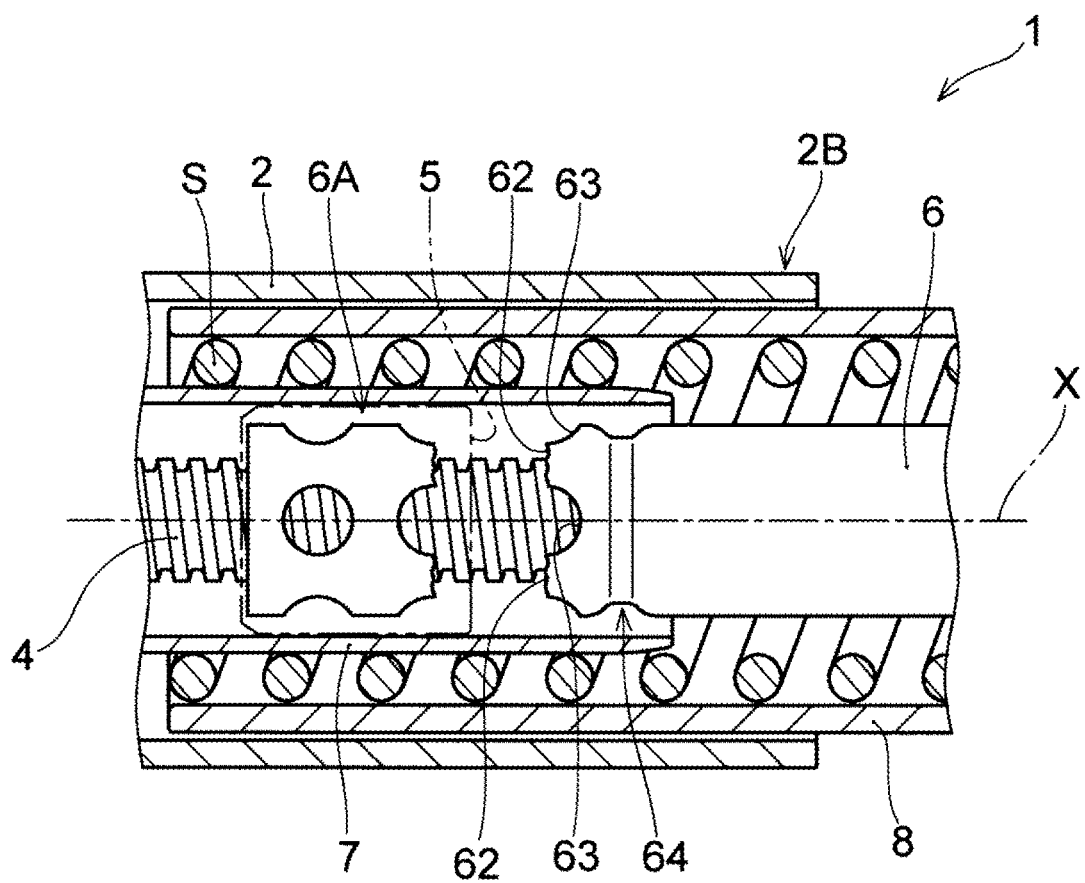
FIG. 8 schematically shows the state in which the fragile portion of the moving member is broken and the moving member is divided from the state shown in FIG. 7 in the axis direction with respect to the nut member.
Figure 10:
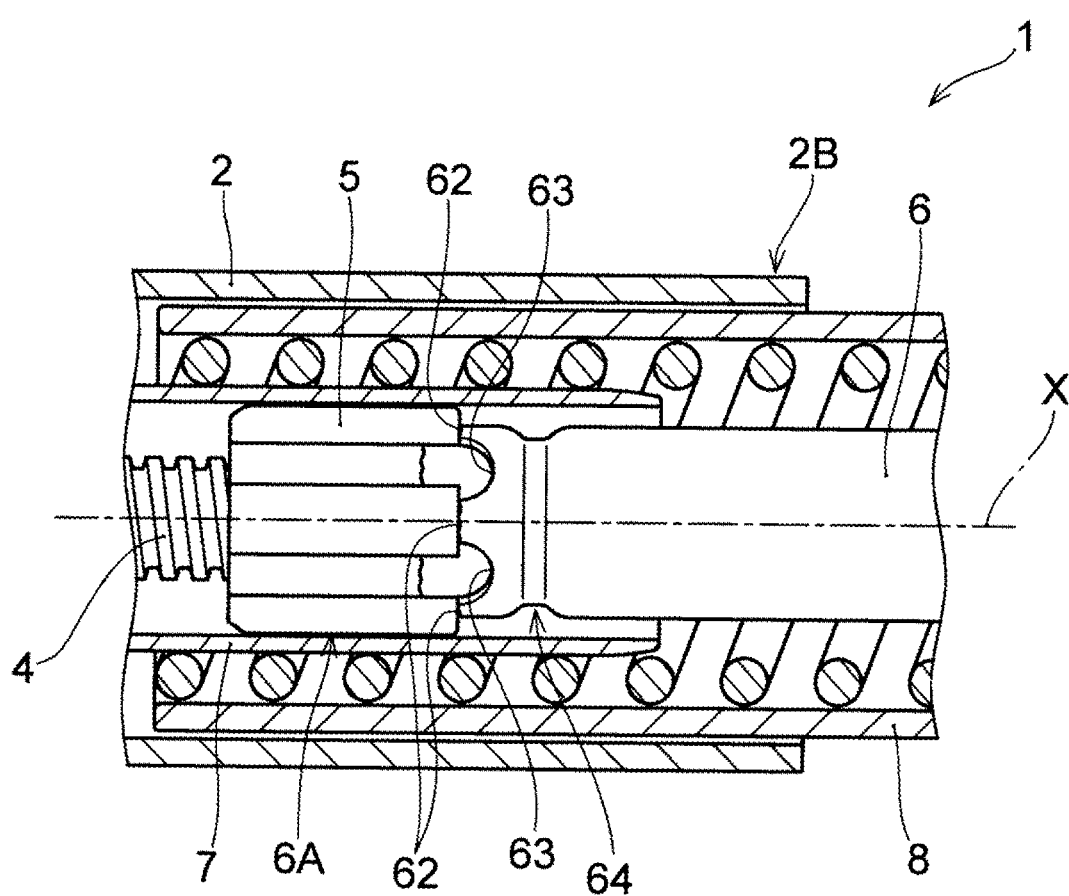
FIG. 10 schematically shows the state in which the nut member is pressed in the axis direction by a fracture portion of the moving member being divided with respect to the nut member in the drive device in FIG. 1.

The fragile portion 61 is a part of the moving member 6, the part to be broken by a force being weaker than a force to break the nut member 5. The fragile portion 61 is formed in the moving member 6 as an intentionally weaker portion than the nut member 5 with respect to the tensile force in the axis X direction. In this way, in a case that a force in the axis X direction is applied to the nut member 5 and the moving member 6, breakage of the nut member 5 is suppressed by configuring the fragile portion 61 of the moving member 6 to be broken in advance as shown in FIGS. 7 and 8. Moreover, the fragile portion 61 is provided such that the nut member 5 may be pressed toward the drive portion 3 as shown in FIG. 10 by the fracture portion 62 to be formed when the fragile portion 61 is broken. In other words, the fragile portion 61 is configured to be broken by a force being weaker than the force required to break the nut member 5, moreover, the portion where the moving member 6 is fractured is set to be a range/position so that the nut member 5 may be pressed. Therefore, the nut member 5 may be easily pressed toward the drive portion 3 by the fracture portion 62 when the moving member 6 is fractured.

As described above, the fragile portion 61 of the moving member 6 is configured to be easily broken. Therefore, it can be recognized by the broken fragile portion 61 that an excessive load is applied to the drive device 1, which is connected to the first base body B1 and the second base body B2, without the drive device 1 being divided from either one of the base bodies B1, B2. Moreover, since the nut member 5 is not broken thanks to the fragile portion 61 of the moving member 6 even when a strong force is applied to the nut member 5 and the moving member 6, screwing between the nut member 5 and the spindle member 4 is maintained. Furthermore, even in a case that the fragile portion 61 of the moving member 6 is fractured and the moving member 6 is divided from the nut member 5, the moving member 6 may be moved in the axis X direction toward the nut member 5 to press the nut member 5 by the fracture portion 62. When the nut member 5 is pressed toward the drive portion 3 by the fracture portion 62 of the moving member 6 and a force exceeding the self-restraining force between the nut member 5 and the spindle member 4 is applied, the nut member 5 can move toward the drive portion 3 while rotating the spindle member 4 around the axis X. Therefore, even when a large force is locally applied to break the moving member 6 and the moving member 6 protrudes from the housing 2, the moving member 6 can be housed in the housing 2 by pushing the moving member 6 in the axis X direction with manual operation or the like.

The structure of the fragile portion 61 is not particularly limited as long as the fragile portion 61 is broken by the force being weaker than the force required to break the nut member 5 and the fracture portion 62 is formed so as to press the nut member 5 toward the drive portion 3. With respect to the fragile portion 61, the fracture portion 62 is formed such that the moving member 6 is divided from the nut member 5 in the axis X direction when the fragile portion 61 is broken.

In the embodiment, a plurality of openings 63 are provided in the peripheral direction as shown in FIG. 6 in a part where the moving member 6 overlaps the nut member 5 in the axis X direction. In that case, the portion between the openings 63 adjacent in the peripheral direction is fragile, therefore, the fragile portion 61 is configured to be more easily broken than the nut member 5. In other words, in the embodiment, the fragile portion 61 is a region between the plurality of openings 63 in the peripheral direction at the one end 6A of the moving member 6. The shape or structure of the fragile portion 61 is not particularly limited as long as the fragile portion 61 is configured to be more easily broken than the nut member 5. While the openings 63 formed in the peripheral direction of the moving member 6 are circular shape in the embodiment, the openings 63 may be configured to be openings having a shape of an ellipse, a long oval, or a rectangle being long in the peripheral direction and the portion between the openings may be a fragile portion, for example. Moreover, the fragile portion 61 may be a slit extending in the peripheral direction of the moving member 6. Furthermore, the fragile portion 61 may be formed in the peripheral direction of the moving member 6 such that the thickness of the fragile portion 61 is thinner than that in other portions.

Moreover, the fracture portion 62 formed by the fragile portion 61 being broken is preferably provided evenly in a direction around the axis X. The fracture portion 62 may be formed evenly in the direction around the axis X by the fragile portion 61 being evenly provided in the direction around the axis X. For example, by the fracture portion 62 being provided evenly in the direction around the axis X at two or more locations in the direction around the axis X, the nut member 5 may be pressed evenly in the direction around the axis X by the fracture portion 62. Therefore, a force being applied unevenly in the peripheral direction of the nut member 5 is suppressed, making it easy to apply a force to overcome the self-restraining force between the nut member 5 and the spindle member 4. In the embodiment, the fragile portion 61 is provided such that the fracture portion 62 of the moving member 6 is formed in a substantially annular shape in a portion where the moving member 6 overlaps the nut member 5 in the axis X direction at one end of the moving member 6, as shown in FIGS. 7 and 8. The term "substantially annular shape" refers to the fracture portions 62 being lined up in the peripheral direction, and the fracture portions 62 being lined up in the peripheral direction do not necessarily have to continuously extend in the whole peripheral direction, so that a gap may be provided therebetween. In a case that the fracture portion 62 is formed in a substantially annular shape, when the fracture portion 62 presses the nut member 5, the fracture portion 62 may substantially annular contact with the nut member 5 (the end surface of the nut member 5) to cause a force to be further applied evenly in the peripheral direction of the nut member 5.

Moreover, the fragile portion 61 is preferably configured to be broken by a force being weaker than a force required to break the first connecting portion C1 and/or the second connecting portion C2. In this case, breakage of the first connecting portion C1 and/or the second connecting portion C2 is suppressed.

Figure 9:
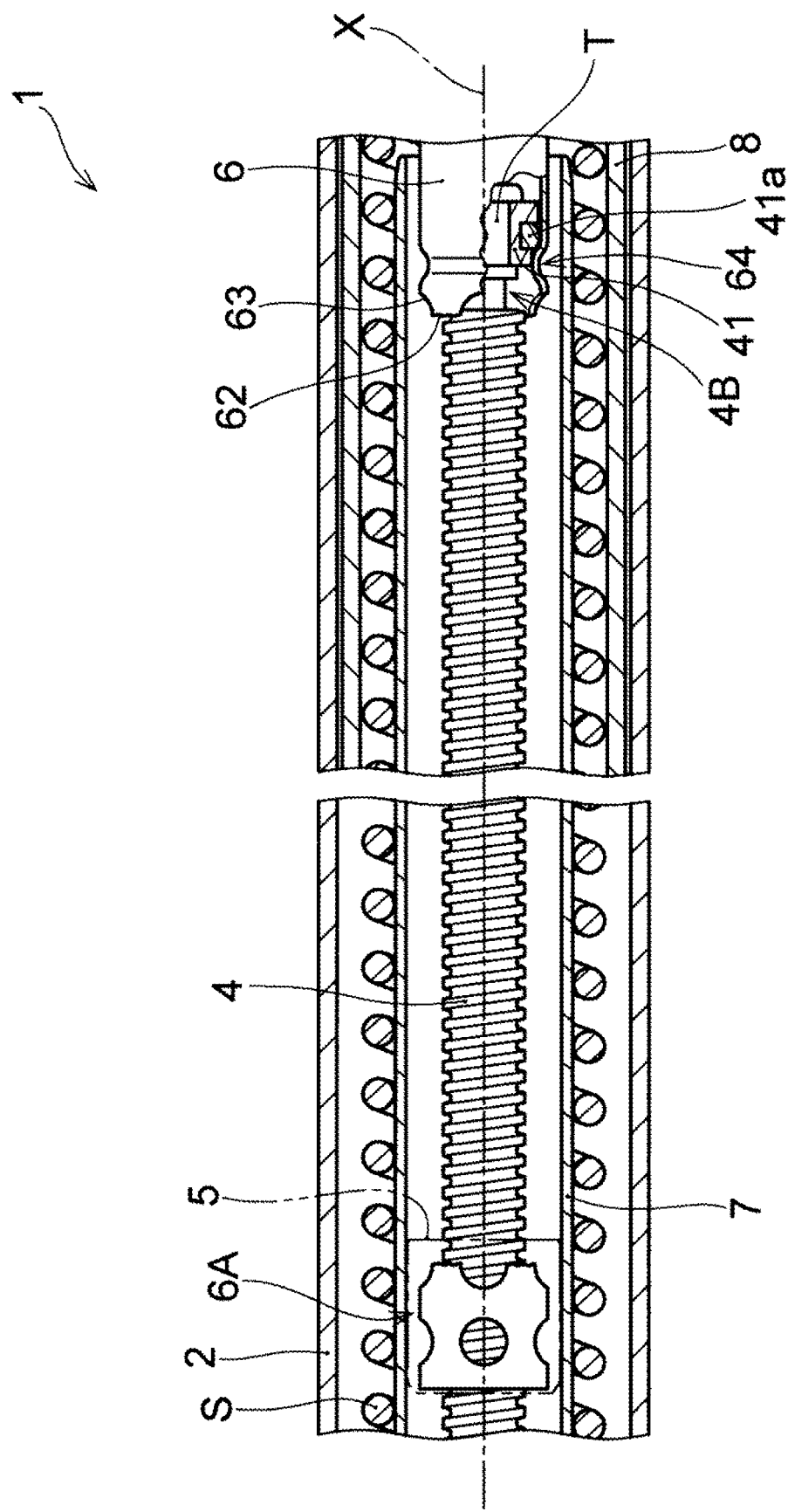
FIG. 9 schematically shows the state in which an engaging member of the moving member is engaged with a coming-off stopper portion of a spindle member in the drive device in FIG. 1.

Furthermore, in the embodiment, as shown in FIGS. 4 and 9, the spindle member 4 has a coming-off stopper portion 41 at a tip T (see FIG. 1) of the spindle member 4 on the other end 4B side, and the moving member 6 has an engaging portion 64 being provided at a side of the tip T of the spindle member 4 with respect to the fragile portion 61 and being engageable with the coming-off stopper portion 41. The coming-off stopper portion 41 provided to the tip T of the spindle member 4 and the engaging portion 64 provided to the moving member 6 function as safety mechanisms when the fragile portion 61 is fractured from the nut member 5. Specifically, the coming-off stopper portion 41 of the spindle member 4 being engaged with the engaging portion 64 of the moving member 6 in the axis X direction makes it possible to suppress that a portion from the fracture portion 62 to the other end 6B of the moving member 6 jumps out to the outside of the housing 2 when the fragile portion 61 of the moving member 6 is broken and the moving member 6 is divided from the nut member 5.

As long as the coming-off stopper portion 41 and the engaging portion 64 can suppress coming off of the moving member 6 from the housing 2, the structure of the coming-off stopper portion 41 and the engaging portion 64 is not particularly limited. In the embodiment, as shown in FIGS. 4 and 9, the coming-off stopper portion 41 protrudes externally in the diameter direction to slidably contact the inner peripheral surface of the moving member 6 at the tip T of the spindle member 4. As shown in FIG. 10, the engaging portion 64 protrudes inwardly from the substantially cylindrical moving member 6 so as to contact with the coming-off stopper portion 41 in the axis X direction when the moving member 6 moves in the direction in which the moving member 6 moves to project from the housing 2.

In the embodiment, the coming-off stopper portion 41 is configured by a cushioning member such as rubber and is configured to be capable of absorbing shock when the coming-off stopper portion 41 engages with the engaging portion 64. Moreover, the coming-off stopper portion 41 has an O ring 41a to abut with the inner peripheral surface of the moving member 6 and suppresses generation of noise at the time of moving of the moving member 6 in the axis X direction with respect to the spindle member 4. Furthermore, in the embodiment, when the drive device 1 is in the longest extended state (corresponding to the opened state S3 of the back door B2), the engaging portion 64 is provided between the fragile portion 61 and the contact portion (see FIG. 2) of the moving member 6 where the moving member 6 contacts with the coming-off stopper portion 41 in the axis X direction.

Next, specific effects of the embodiment will be described by providing examples in which the drive device 1 in the embodiment is applied to the opening/closing device of the back door of the vehicle.

For example, in FIG. 3, when the drive portion 3 is driven in the closed state S1 in which the back door B2 is closed with respect to the vehicle body B1, the spindle member 4 rotates around the axis X by the drive portion 3 and the nut member 5 moves in the axis X direction from being in the state shown in FIG. 1 to being in the state shown in FIG. 2. By the movement of the nut member 5 in the axis X direction, the moving member 6 moves in the axis X direction such that the moving member 6 projects from the housing 2. When the moving member 6 projects from the housing 2 and the entire length of the drive device 1 extends, in the first connection portion C1 and the second connection portion C2 of the drive device 1, the drive device 1 pushes up the back door B2 while changing the angle with respect to the vehicle body B1 and the back door B2. By the operation of the drive device 1, the back door B2 is opened toward being in the opened state S3. In the halfway opened state S2 being between the closed state S1 and the opened state S3, a force may be applied to the back door B2 by the user in the opening direction, for example. In this case, a large force may be applied to the nut member 5 via the moving member 6 by the force applied to the back door B2.

In the embodiment, the fragile portion 61 is provided that is broken by a force being weaker than a force required by the moving member 6 to break the nut member 5 when a large force is applied to the nut member 5 via the moving member 6. Therefore, as shown in FIG. 7, the fragile portion 61 is broken in advance before the nut member 5 is broken. When the fragile portion 61 is broken, the moving member 6 is fractured in the peripheral direction in a portion of the fragile portion 61 as shown in FIG. 8. A portion from the fracture portion 62 to the other end 6B of the moving member 6 is decoupled from the nut member 5 to be divided in the axis X direction with respect to the nut member 5. In this way, breakage of the nut member 5 is suppressed and the screwing state between the spindle member 4 and the nut member 5 is maintained.

When the moving member 6 is decoupled from the nut member 5 by the fracture portion 62, the moving member 6 moves in the direction in which the moving member 6 projects from the housing 2 by a biasing force of the spring S. However, as shown in FIG. 10, the engaging portion 64 of the moving member 6 engages with the coming-off stopper portion 41 of the spindle member 4. In this way, coming off of the moving member 6 from the housing 2 is suppressed.

While a large force is also applied in the first connecting portion C1 and the second connecting portion C2 when the fragile portion 61 of the moving member 6 is broken, in a case that the fragile portion 61 is configured to be broken by a force weaker than a force required to break the first connecting portion C1 and/or the second connecting portion C2, breakage of the first connecting portion C1 and the second connecting portion C2 is also suppressed. Therefore, the coupling state between the back door B2 and the drive device 1 and the coupling state between the drive device 1 and the vehicle body B1 are maintained.

In a case that the back door B2 is closed after the fragile portion 61 is broken, the back door B2 is manually pushed downward in FIG. 3, for example. When the back door B2 is pushed downward, as shown in FIG. 3, the moving member 6 moves, with the movable cylinder 8 projecting from the housing 2, in the direction of being housed in the housing 2. When the moving member 6 moves in the direction of being housed in the housing 2, the fracture portion 62 of the moving member 6 moves toward the nut member 5 and abuts with the nut member 5 in the axis X direction via the end surface of the nut member 5 or the like. When a force is further applied in the direction in which the back door B2 is pushed down after the fracture portion 62 of the moving member 6 abuts with the nut member 5, the nut member 5 moves in the axis X direction while rotating the spindle member 4 around the axis X while overcoming the self-restraining force between the nut member 5 and the spindle member 4, making it possible to close the back door B2. In a case that the end surface of the nut member 5 is a planar surface extending perpendicularly to the axis X, the end surface of the nut member 5 easily abuts with the fracture portion 62 of the moving member 6, so that a force is easily transmitted to the nut member 5.

In a case that the back door B2 is to be opened from being in the closed state S1 in which the back door B2 is closed, the drive portion 3 is driven to rotate the spindle member 4 around the axis X. As described above, the screwing state between the nut member 5 and the spindle member 4 is maintained by breaking the fragile portion 61 in advance of the nut member 5. Therefore, the nut member 5 may be moved in the axis X direction by rotating the spindle member 4. In this way, the moving member 6 can be moved to open the back door B2.

DESCRIPTION OF REFERENCE NUMERALS

1 DRIVE DEVICE
2 HOUSING
2A ONE END OF HOUSING
2B THE OTHER END OF HOUSING
3 DRIVE PORTION
4 SPINDLE MEMBER
4A ONE END OF SPINDLE MEMBER
4B THE OTHER END OF SPINDLE MEMBER
41 COMING-OFF STOPPER PORTION
41a O RING
5 NUT MEMBER
6 MOVING MEMBER
6A ONE END OF MOVING MEMBER
6B THE OTHER END OF MOVING MEMBER
61 FRAGILE PORTION
62 FRACTURE PORTION
63 OPENING
64 ENGAGING PORTION
7 CYLINDRICAL BODY
8 MOVABLE CYLINDER
9 ROTATION REGULATING PORTION
91 FIRST REGULATING PORTION
92 SECOND REGULATING PORTION
B BEARING
B1 FIRST BASE BODY (VEHICLE BODY)
B2 SECOND BASE BODY (BACK DOOR)
C1 FIRST CONNECTING PORTION
C2 SECOND CONNECTING PORTION
H HINGE
S SPRING
S1 CLOSED STATE
S2 HALFWAY OPENED STATE
S3 OPENED STATE

T TIP OF THE OTHER END SIDE OF SPINDLE MEMBER
X AXIS OF SPINDLE MEMBER

The invention claimed is:

1. A drive device comprising:
a housing having a first connecting portion connected to a first base body;
a drive portion provided in the housing;
a spindle member to rotate by driving of the drive portion;
a nut member screwed with the spindle member; and
a moving member coupled to the nut member, wherein
the drive device has a rotation regulating portion which suppresses rotation of the nut member to move the nut member in an axial direction of the spindle member,
the moving member has a second connecting portion connected to a second base body, and a fragile portion to be broken by a predetermined force being weaker than a force required to break the nut member,
the fragile portion is formed such that the moving member is divided from the nut member in the axial direction when the fragile portion is broken,
the fragile portion is configured such that a fracture portion, with which the nut member is pressable by the moving member moving toward the drive portion, is formable when the fragile portion is broken,
the moving member is embedded into the nut member on one end side of the moving member so as to overlap the nut member in the axial direction, and
a plurality of openings are provided in a peripheral direction in a art where the moving member overlaps the nut member in the axial direction to form the fragile portion.

2. The drive device according to claim 1, wherein the moving member is substantially cylindrically shaped, and the fracture portion is substantially annular shaped.

3. The drive device according to claim 2, wherein
the spindle member has a coming-off stopper portion at a tip of the spindle member, and
the moving member has an engaging portion provided at a side of the tip of the spindle member with respect to the fragile portion, the engaging portion being engageable with the coming-off stopper portion.

4. The drive device according to claim 1, wherein
the spindle member has a coming-off stopper portion at a tip of the spindle member, and
the moving member has an engaging portion provided at a side of the tip of the spindle member with respect to the fragile portion, the engaging portion being engageable with the coming-off stopper portion.

* * * * *

UNITED STATES PATENT AND TRADEMARK OFFICE
CERTIFICATE OF CORRECTION

| | |
|---|---|
| PATENT NO. | : 11,754,156 B2 |
| APPLICATION NO. | : 17/287806 |
| DATED | : September 12, 2023 |
| INVENTOR(S) | : Hiroyuki Inagaki et al. |

It is certified that error appears in the above-identified patent and that said Letters Patent is hereby corrected as shown below:

In the Claims

Column 12, Line 5, delete "art" and insert --part-- therefor.

Signed and Sealed this
Nineteenth Day of December, 2023

*Katherine Kelly Vidal*

Katherine Kelly Vidal
*Director of the United States Patent and Trademark Office*